(12) United States Patent
Hashimoto et al.

(10) Patent No.: US 12,145,464 B2
(45) Date of Patent: Nov. 19, 2024

(54) CONTROL DEVICE THAT CONTROLS ELECTRICALLY POWERED VEHICLE AND METHOD OF CONTROLLING ELECTRICALLY POWERED VEHICLE

(71) Applicant: TOYOTA JIDOSHA KABUSHIKI KAISHA, Toyota (JP)

(72) Inventors: Toshiya Hashimoto, Miyoshi (JP); Kazuhisa Matsuda, Sunto-gun (JP); Fumihiko Nakamura, Susono (JP); Manabu Handa, Susono (JP); Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/810,400

(22) Filed: Jul. 1, 2022

(65) Prior Publication Data
US 2023/0012118 A1 Jan. 12, 2023

(30) Foreign Application Priority Data

Jul. 6, 2021 (JP) ................................. 2021-112164

(51) Int. Cl.
| | |
|---|---|
| *G01C 21/34* | (2006.01) |
| *B60L 53/12* | (2019.01) |
| *B60L 53/30* | (2019.01) |
| *B60L 53/66* | (2019.01) |
| *H02J 50/80* | (2016.01) |
| *H02J 50/10* | (2016.01) |

(52) U.S. Cl.
CPC ............. *B60L 53/665* (2019.02); *B60L 53/12* (2019.02); *B60L 53/30* (2019.02); *H02J 50/80* (2016.02); *H02J 50/10* (2016.02)

(58) Field of Classification Search
CPC ......... G01C 21/34; B60L 53/66; B60L 53/12; B60L 53/30; B60L 9/16; H02J 50/80; H02J 50/90; H02J 50/10; Y02T 90/12
See application file for complete search history.

(56) References Cited

U.S. PATENT DOCUMENTS

| | | | | |
|---|---|---|---|---|
| 2011/0078092 A1* | 3/2011 | Kim | ....................... | B60L 53/305 |
| | | | | 320/109 |
| 2014/0285139 A1* | 9/2014 | Ahn | ....................... | B60L 53/36 |
| | | | | 320/108 |

(Continued)

FOREIGN PATENT DOCUMENTS

JP 2013-200247 A 10/2013

*Primary Examiner* — Tan Q Nguyen
(74) *Attorney, Agent, or Firm* — Finnegan, Henderson, Farabow, Garrett, and Dunner, LLP (57) ABSTRACT

An ECU controls a vehicle including a power reception unit that can wirelessly receive electric power from a power feeding facility placed on a travel road. The ECU includes a memory in which a user-desired condition is stored, the user-desired condition being a condition under which a user of the vehicle desires on-road power reception, the on-road power reception being power reception from the power feeding facility placed on the travel road, and a processor connected to the memory. When a physical condition for power feeding from the power feeding facility to the vehicle is satisfied and when the user-desired condition stored in the memory is not satisfied, the processor controls the power reception unit to suppress on-road power reception.

8 Claims, 7 Drawing Sheets

(56) References Cited

U.S. PATENT DOCUMENTS

| | | | |
|---|---|---|---|
| 2014/0292270 A1* | 10/2014 | Ichikawa | B60L 53/52 |
| | | | 320/108 |
| 2019/0047431 A1* | 2/2019 | Iwashita | B60L 53/32 |
| 2019/0061534 A1* | 2/2019 | Iwashita | B60L 53/12 |
| 2022/0012647 A1* | 1/2022 | Lee | B60L 53/305 |
| 2022/0097558 A1* | 3/2022 | Dow | B60L 53/60 |
| 2022/0289048 A1* | 9/2022 | Masuyama | B60L 3/0015 |
| 2022/0375006 A1* | 11/2022 | Polania Castro | B60L 53/66 |
| 2023/0024900 A1* | 1/2023 | Ayoola | B60L 55/00 |

* cited by examiner

CONTROL DEVICE THAT CONTROLS ELECTRICALLY POWERED VEHICLE AND METHOD OF CONTROLLING ELECTRICALLY POWERED VEHICLE

This nonprovisional application is based on Japanese Patent Application No. 2021-112164 filed with the Japan Patent Office on Jul. 6, 2021, the entire contents of which are hereby incorporated by reference.

BACKGROUND

Field

The present disclosure relates to a control device that controls an electrically powered vehicle including a power reception unit that can wirelessly receive electric power from a power feeding facility placed on a travel road and a method of controlling the electrically powered vehicle.

Description of the Background Art

Japanese Patent Laying-Open No. 2013-200247 discloses a navigation apparatus that searches for and shows a travel route of a vehicle including a power reception unit that can wirelessly receive electric power from a power feeding facility placed on a road. This navigation apparatus searches for and shows a shortest route to a destination and a route via a road where a power feeding facility is placed to a destination while the vehicle wirelessly receives electric power from the facility. A user can select a travel route suited to his/her purpose.

SUMMARY

If electric power is unconditionally fed when a physical condition for power feeding for wireless power feeding from a wireless power feeding facility placed on a road to a vehicle by travel of the vehicle over the facility is satisfied, electric power will forcibly be fed in spite, for example, of disagreement between a power feeding fee or a power feeding unit price and an amount desired by the user, which leads to a concern about compromised convenience of the user.

The present disclosure was made to solve the problem above, and an object of the present disclosure is to carry out on-road power reception without compromised convenience of a user in an electrically powered vehicle capable of on-road power reception which is wireless reception of electric power from a facility placed on a travel road.

(1) A control device according to the present disclosure is a control device that controls an electrically powered vehicle including a power reception unit that wirelessly receives electric power from a facility placed on a travel road. The control device includes a memory in which a user-desired condition is stored, the user-desired condition being a condition under which a user of the electrically powered vehicle desires on-road power reception, the on-road power reception being power reception from the facility by the power reception unit, and a processor connected to the memory. When a physical condition for power feeding from the facility to the power reception unit is satisfied and when the user-desired condition stored in the memory is not satisfied, the processor controls the power reception unit to suppress the on-road power reception.

In the configuration, unless the user-desired condition is satisfied even when the physical condition for power feeding from the facility placed on the travel road to the power reception unit is satisfied, on-road power reception is suppressed. Ordinary on-road power reception forcibly carried out in spite of the user-desired condition not being fulfilled is thus suppressed. Consequently, in the vehicle capable of on-road power reception, on-road power reception can be carried out without compromised convenience of the user.

(2) In one aspect, when the physical condition for power feeding is satisfied and when the user-desired condition is not satisfied, the processor prohibits the on-road power reception or sets an amount of received power in the on-road power reception to be smaller than when the user-desired condition is satisfied.

In the configuration, on-road power reception can be suppressed by prohibiting on-road power reception or reducing the amount of received power in on-road power reception.

(3) In one aspect, a port to which information on the facility is provided is further provided. The information on the facility includes information on a fee or a unit price of electric power fed from the facility. The user-desired condition includes a condition that the fee or the unit price of electric power fed from the facility is lower than a prescribed value.

In the configuration, when the fee or the unit price of electric power fed from the facility is higher than the amount desired by the user, on-road power reception can be suppressed.

(4) In one aspect, when the physical condition for power feeding is satisfied and when the user-desired condition is not satisfied, the processor sets an amount of received power in the on-road power reception to be smaller as the fee or the unit price of electric power fed from the facility is higher.

In the configuration, the amount of received power in on-road power reception can be suppressed in accordance with the fee or the unit price of electric power fed from the power feeding facility.

(5) In one aspect, the electrically powered vehicle includes a battery for traveling that is charged with electric power received by the power reception unit. The user-desired condition includes a condition that an amount of stored power in the battery is smaller than a prescribed value.

In the configuration, on-road power reception can be suppressed when the amount of stored power in the battery exceeds the prescribed value. Deterioration of the battery with a large amount of stored power in the battery being maintained by on-road power reception can thus be suppressed as desired by the user.

(6) In one aspect, a port to which information on the facility is provided is further provided. The information on the facility includes information on a $CO_2$ emission amount in generation of electric power fed from the facility. The user-desired condition includes a condition that the $CO_2$ emission amount is smaller than a prescribed value.

In the configuration, on-road power reception from the facility in which the $CO_2$ emission amount during power generation exceeds the prescribed value can be suppressed. On-road reception of electric power, generation of which causes a large amount of $CO_2$ emission, can thus be suppressed to meet the needs of a user with high awareness of global environment protection.

(7) In one aspect, when the physical condition for power feeding is satisfied and when the user-desired condition is satisfied, the processor inquires of the user whether or not to carry out the on-road power reception, and carries out the on-road power reception when the processor receives an answer indicating carrying out the on-road power reception to an inquiry. When the physical condition for power feeding is satisfied and when the user-desired condition is not satisfied, the processor suppresses the on-road power reception without inquiring of the user whether or not to carry out the on-road power reception.

In the configuration, by further individually inquiring of the user whether or not to carry out on-road power reception when the physical condition for power feeding is satisfied and when the user-desired condition is satisfied, on-road power reception more appropriately reflecting desire of the user can be carried out. When the user-desired condition is not satisfied even when the physical condition for power feeding is satisfied, on-road power reception is suppressed without an inquiry to the user. Therefore, the number of times of inquiry to the user can be smaller than when the inquiry is issued to the user each time the physical condition for power feeding is satisfied.

(8) A control method according to the present disclosure is a method of controlling an electrically powered vehicle including a power reception unit that wirelessly receives electric power from a facility placed on a travel road. The control method includes obtaining a user-desired condition, the user-desired condition being a condition under which a user of the electrically powered vehicle desires on-road power reception, the on-road power reception being power reception from the facility by the power reception unit, and controlling the power reception unit to suppress the on-road power reception when the user-desired condition is not satisfied even when a physical condition for power feeding from the facility to the power reception unit is satisfied.

In the configuration, functions and effects similar to those of the control device in (1) can be achieved.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

<System Configuration>

Figure 1:
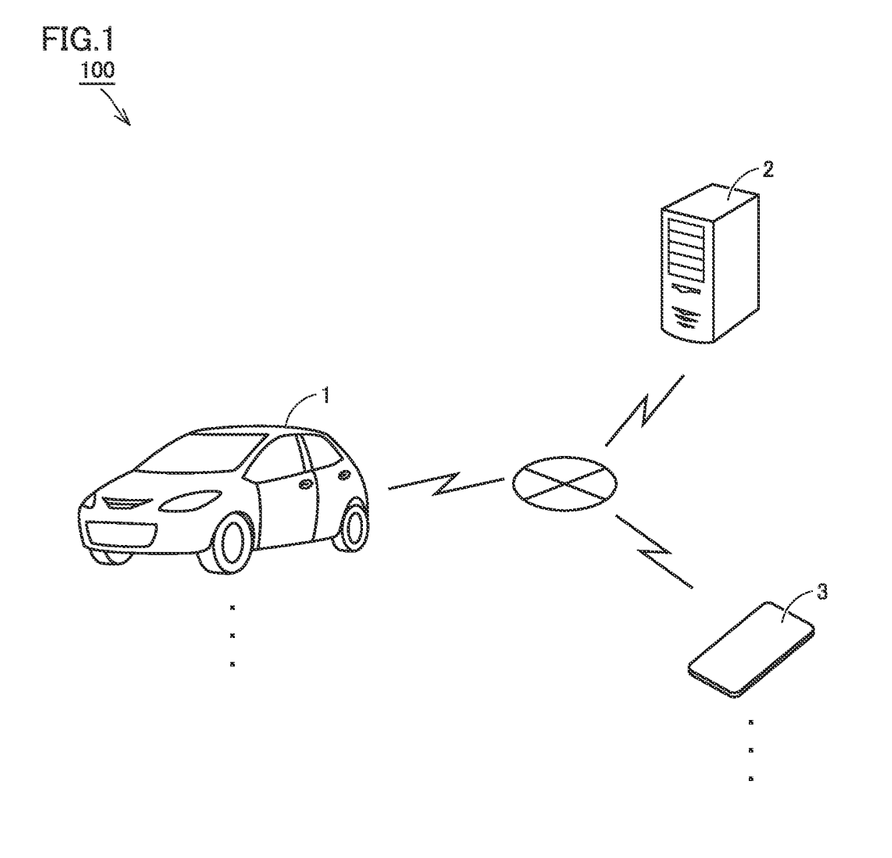
FIG. 1 is a diagram schematically showing an exemplary overall configuration of a vehicle management system.

FIG. 1 is a diagram schematically showing an exemplary overall configuration of a vehicle management system 100 according to an embodiment of the present disclosure. Vehicle management system 100 includes a plurality of vehicles 1, a server 2, and a plurality of user terminals 3.

Each of the plurality of vehicles 1 is an electrically powered vehicle incorporating a battery for traveling, and it is, for example, an electric vehicle (EV), a hybrid electric vehicle (HEV), or a plug-in hybrid electric vehicle (PHEV). Each vehicle 1 is configured to wirelessly receive electric power from a power feeding facility 9 (see FIGS. 3 and 4) placed on a road surface of a travel road. Wireless power reception from power feeding facility 9 is also referred to as "on-road power reception" below. A detailed configuration of vehicle 1 will be described with reference to FIGS. 2 and 3.

Server 2 manages the plurality of vehicles 1. Latest road information and information on power feeding facility 9 (information on power feeding specs, a location of placement, and a power feeding unit price) are held in server 2. A detailed configuration of server 2 will be described with reference to FIG. 2.

Each of the plurality of user terminals 3 is a terminal operated by a user of vehicle 1, and it is, for example, a smartphone. The user can search for a travel route of vehicle 1 by inputting a destination of vehicle 1 by operating user terminal 3. Vehicle 1, server 2, and user terminal 3 are configured to bidirectionally communicate with each other over a network such as the Internet.

Figure 2:
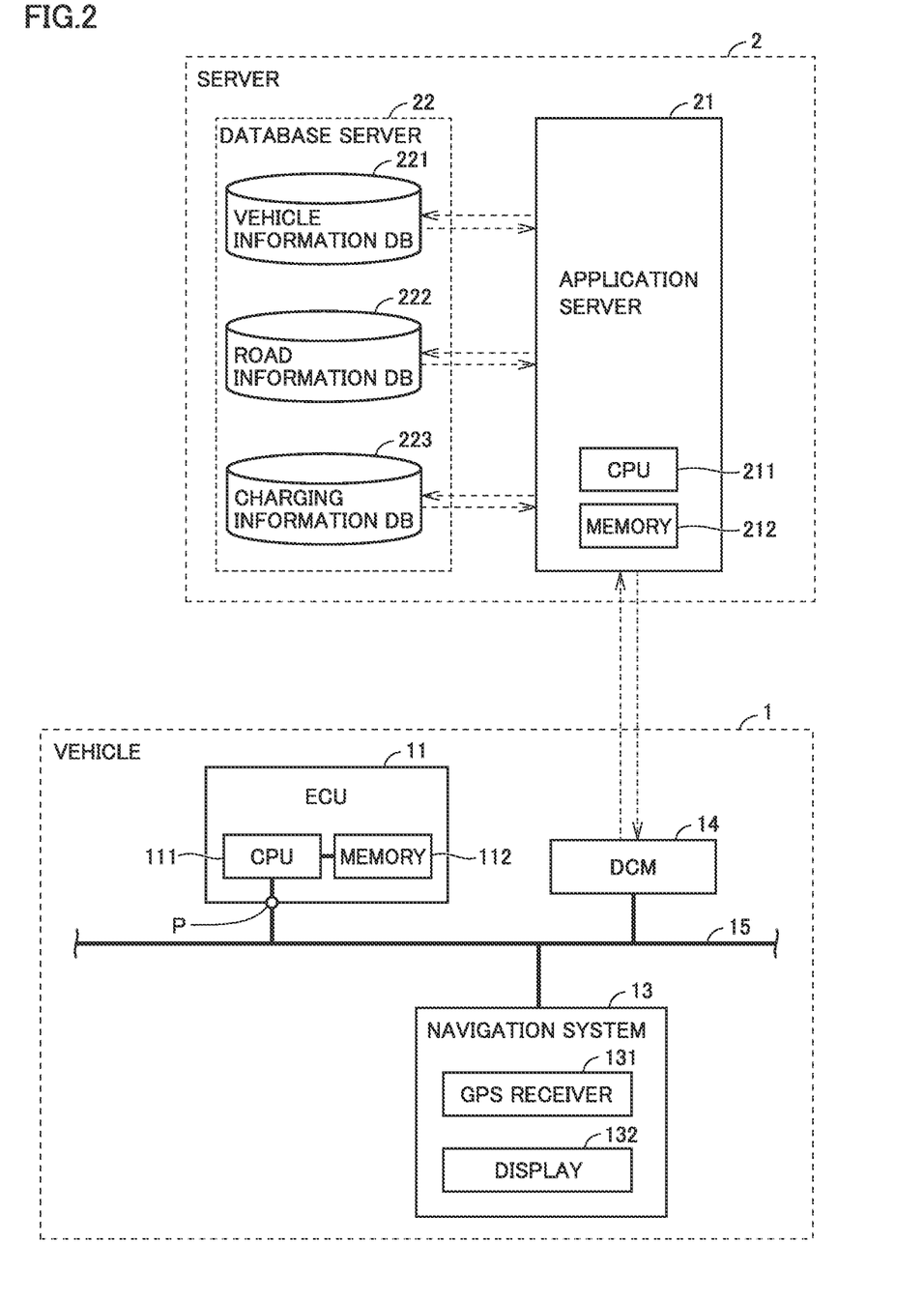
FIG. 2 is a diagram showing in further detail, a configuration of a vehicle and a server.

FIG. 2 is a diagram showing in further detail, a configuration of vehicle 1 and server 2. Vehicle 1 includes an electronic control unit (ECU) 11, a navigation system 13, and a communication module 14. ECU 11, navigation system 13, and communication module 14 can communicate with one another over a vehicle-mounted network 15 such as a controller area network (CAN).

ECU 11 includes a processor 111 such as a central processing unit (CPU), a memory 112 such as a read only memory (ROM) and a random access memory (RAM), and an input port P connected to vehicle-mounted network 15.

Processor 111 is connected to memory 112 and configured to perform prescribed computing processing described in a program. A program executed by processor 111 is stored in memory 112. Data generated by execution of a program by processor 111 and data provided to input port P from vehicle-mounted network 15 are temporarily stored in memory 112.

Processor 111 controls each device in vehicle 1 such that vehicle 1 is in a desired state, based on detection values from various sensors (not shown) and a program and data stored in memory 112. Processor 111 generates various types of information transmitted and received to and from server 2.

Navigation system 13 guides the travel route of vehicle 1. Navigation system 13 includes a processor, a memory (not shown), a global positioning system (GPS) receiver 131, and a display 132 with a touch panel.

GPS receiver 131 specifies a position of vehicle 1 based on radio waves from an artificial satellite (not shown). Navigation system 13 performs various types of navigation processing (search for a travel route or the like) by using position information (GPS information) of vehicle 1 specified by GPS receiver 131.

Various types of information are shown on display 132 and display 132 accepts various operations by a user. More specifically, on display 132, a current position of vehicle 1 and a position of placement of power feeding facility 9 are shown in a road map around vehicle 1. Display 132 accepts an operation by the user to select the travel route of vehicle 1.

Communication module 14 is a vehicle-mounted data communication module (DCM) and configured such that ECU 11 and server 2 bidirectionally communicate with each other.

Server 2 includes an application server 21 and a database server 22. Database server 22 includes a vehicle information database 221, a road information database 222, and a charging information database 223.

Application server 21 collects position information (GPS information) and state-of-charge (SOC) information of each of the plurality of vehicles 1. The information is regularly transmitted from each vehicle 1 to server 2. Application server 21 has the collected information stored in vehicle information database 221. Information on a type, a model year, a model, specifications, and a state (for example, a state of deterioration and a full charge capacity of a battery) of each vehicle 1 is also stored in vehicle information database 221. Application server 21 may obtain records of travel of each vehicle 1 or more specifically data on power consumption measured during travel of each vehicle 1 for each of various travel conditions (a travel route, a date, day of the week, weather, an air temperature, or the like) and have them stored in vehicle information database 221.

Road information is stored in road information database 222. Information on power feeding facility 9 (which is also denoted as "road facility information" below) placed on the travel road is stored in charging information database 223. The road facility information includes information not only on power feeding specifications (for example, power feeding capability or the like), a location of placement, a power feeding fee, and a power feeding unit price of power feeding facility 9 but also on presence a failure and a $CO_2$ emission amount during generation of feed power. The information on the $CO_2$ emission amount may be expressed as a value of the $CO_2$ emission amount itself or a ratio of renewable energy. The ratio of renewable energy refers to a ratio of electric power generated using renewable energy (solar rays, wind power, geothermal heat, or the like) low in environmental load to total generated electric power. In power generation using renewable energy, substantially no $CO_2$ is emitted. Therefore, the ratio of renewable energy is a value that correlates with the $CO_2$ emission amount during power generation.

The road may newly be constructed or a geometry of the road may be changed. In addition, power feeding facility 9 may newly be placed or existing power feeding facility 9 may be decommissioned. Furthermore, the power feeding fee, the power feeding unit price, and the ratio of renewable energy of power feeding facility 9 may be changed. Therefore, information stored in road information database 222 and charging information database 223 is regularly updated to a latest state by a manager of server 2.

The road facility information or the like stored in server 2 is transmitted to vehicle 1 at prescribed timing and provided to input port P of ECU 11. The road facility information or the like provided to input port P is stored in memory 112 and used for computation by processor 111.

<On-Road Power Reception>

Figure 3:
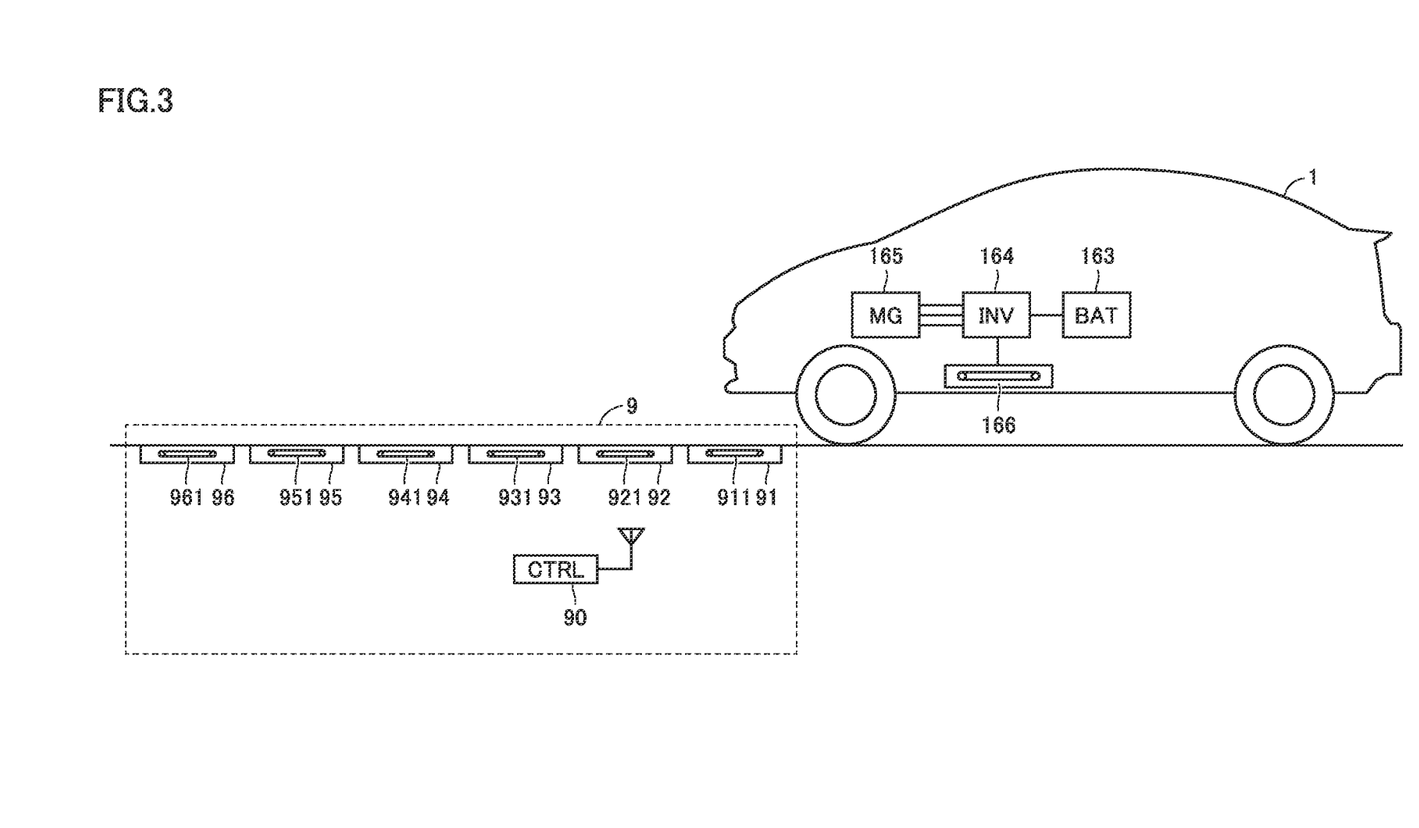
FIG. 3 is a diagram schematically showing an exemplary configuration of the vehicle and a power feeding facility.

FIG. 3 is a diagram schematically showing an exemplary configuration of vehicle 1 and power feeding facility 9. Vehicle 1 further includes a battery 163, an inverter 164, a motor generator 165, and a power reception unit 166 in addition to components shown in FIG. 2.

Battery 163 is a battery assembly including a plurality of cells. Each cell is a secondary battery such as a lithium ion battery or a nickel metal hydride battery. Battery 163 is a battery for traveling that supplies electric power for generating driving force of vehicle 1 to motor generator 165. Electric power generated by motor generator 165 is stored in battery 163. Battery 163 is provided with a voltage sensor and a current sensor (neither of which is shown) for calculation of the SOC of battery 163 by ECU 11.

Inverter 164 converts direct-current (DC) power stored in battery 163 to alternating-current (AC) power and supplies resultant AC power to motor generator 165. Inverter 164 converts AC power (regenerative power) from motor generator 165 to DC power so that battery 163 is charged with DC power. Inverter 164 further converts AC power received by power reception unit 166 to DC power so that battery 163 is charged with DC power.

Motor generator 165 has vehicle 1 travel by receiving supply of electric power from inverter 164 and providing rotational force to a drive wheel.

In an example shown in FIG. 3, power reception unit 166 is arranged on a lower surface of a floor panel that forms a bottom surface of vehicle 1. A power reception coil is accommodated in power reception unit 166. The power reception coil wirelessly receives electric power transmitted from power feeding facility 9.

Power feeding facility 9 includes a plurality of power transmission units 91 to 96 and a controller 90. Though FIG. 3 shows an example in which six power transmission units are provided, the number of power transmission units is not particularly limited and a larger number of power transmission units may be provided.

The plurality of power transmission units 91 to 96 are arranged in line on the road surface. The plurality of power transmission units 91 to 96 include power transmission coils 911 to 961, respectively. Power transmission coils 911 to 961 are electrically connected to an AC power supply (not shown). Though not shown, each of the plurality of power transmission units 91 to 96 is provided with a sensor (an optical sensor, a weight sensor, or the like) that detects passage of vehicle 1.

Controller 90 specifies a position of traveling of vehicle 1 based on a detection signal from each sensor. Then, controller 90 has AC power from the AC power supply supplied to a power transmission coil in a power transmission unit above which vehicle 1 is located, among power transmission units 91 to 96.

More specifically, when vehicle 1 is detected, for example, above power transmission unit 91, controller 90 has AC power supplied to power transmission coil 911. Then, an AC current flows through power transmission coil 911, so that electromagnetic field is formed around power transmission coil 911. The power reception coil within power reception unit 166 wirelessly receives electric power through the electromagnetic field. Thereafter, when vehicle 1 is no longer detected above power transmission unit 91, controller 90 stops supply of AC power to power transmission coil 911. As such a series of control is carried out for each of power transmission units 91 to 96, electric power can wirelessly be transmitted to traveling vehicle 1 (on-road power reception).

<Travel Route of Vehicle 1>

Figure 4:
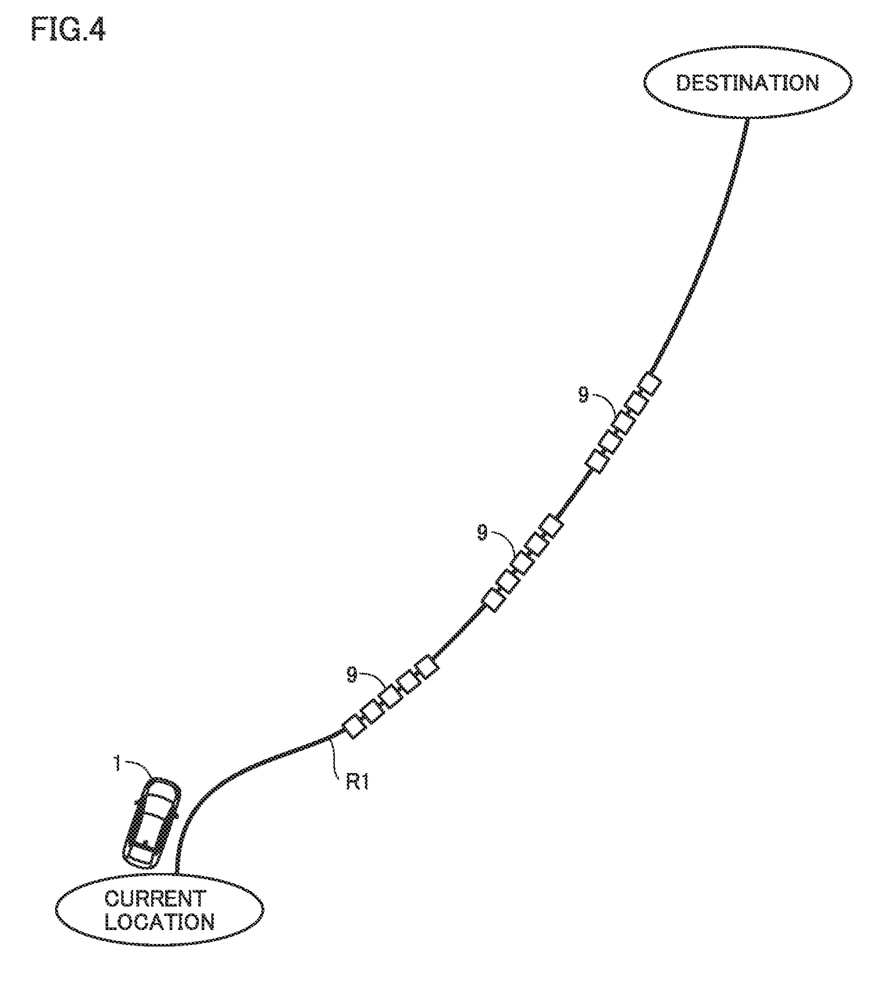
FIG. 4 is a diagram showing an exemplary travel route of the vehicle.

FIG. 4 is a diagram showing an exemplary travel route of vehicle 1. In this example, three power feeding facilities 9 each with power feeding specs adapted to wireless power feeding to vehicle 1 are placed on a travel route R1 from a current location to a destination of vehicle 1.

When vehicle 1 travels over power feeding facility 9 placed on the road on travel route R1 and when power feeding facility 9 and vehicle 1 are physically in a state in which they can normally carry out on-road power reception (for example, the power feeding specs of power feeding facility 9 are adapted to power reception specs of power reception unit 166 of vehicle 1 and both of power feeding facility 9 and power reception unit 166 can normally operate without being in an overheated state), a physical condition for power feeding from power feeding facility 9 to power reception unit 166 of vehicle 1 is satisfied.

The physical condition for power feeding may include not only a condition of the specs of and a distance between power feeding facility 9 and power reception unit 166 and vehicle 1 and a condition of a temperature of power feeding facility 9 and vehicle 1 but also a condition that battery 163 of vehicle 1 is not in an overdischarged state and an overcharged state. In any case, the physical condition for power feeding is determined in advance by a manufacturer or a manager of vehicle management system 100, and cannot freely be changed by a user of vehicle 1.

<Suppression of On-Road Power Reception Desired by User>

If on-road power reception is unconditionally carried out when the physical condition for power feeding from power feeding facility 9 to power reception unit 166 of vehicle 1 is satisfied, on-road power reception will forcibly be carried out in spite, for example, of disagreement between a power feeding fee or a power feeding unit price and an amount desired by the user, which leads to a concern about compromised convenience of a user.

Then, processor 111 of ECU 11 of vehicle 1 according to the present embodiment controls power reception unit 166 to suppress on-road power reception when a condition under which the user of vehicle 1 desires on-road power reception (which is also denoted as a "user-desired condition" below) is not satisfied even when the physical condition for power feeding from power feeding facility 9 to power reception unit 166 is satisfied. In vehicle 1 capable of on-road power reception, on-road power reception can thus be carried out without compromised convenience of the user.

The user-desired condition is set in advance by the user of vehicle 1 and stored in memory 112 of ECU 11 of vehicle 1. The user-desired condition is assumed to include a condition of the fee, a condition of the SOC, a condition of the temperature, a condition of the $CO_2$ emission amount, and the like.

The condition of the fee may include, for example, a condition that a fee or a unit price of electric power fed from power feeding facility 9 is lower than an amount desired by the user. On-road power reception can thus be suppressed when the fee or the unit price of electric power fed from power feeding facility 9 exceeds the amount desired by the user.

The condition of the SOC may include a condition that the SOC (an amount of stored power) of battery 163 is lower than a value set by the user for suppressing deterioration of the battery, in view of tendency of deterioration of battery 163 when a high-SOC state of battery 163 continues. Deterioration of battery 163 due to on-road power reception can thus be suppressed as desired by the user.

When the SOC at the time of arrival of vehicle 1 at the destination is predictable, for suppressing deterioration of the battery at the time of arrival at the destination, the condition of the SOC may include a condition that the predicted SOC at the time of arrival at the destination is lower than a value set by the user.

The condition of the temperature may include a condition that the temperature of battery 163 is lower than a value set by the user, for suppression of deterioration of the battery, in view of tendency of deterioration of battery 163 when the temperature of battery 163 is high and the high-SOC state thereof continues. Deterioration of battery 163 due to on-road power reception can thus be suppressed as desired by the user.

The condition of the $CO_2$ emission amount may include a condition that the $CO_2$ emission amount during generation of electric power to be fed from power feeding facility 9 is smaller than a value set by the user. The $CO_2$ emission amount may be determined as being smaller than the value set by the user when the ratio of renewable energy in electric power fed from power feeding facility 9 exceeds a prescribed value. On-road reception of electric power, generation of which causes a large amount of $CO_2$ emission, can thus be suppressed to meet the needs of a user with high awareness of global environment protection.

The user-desired condition is thus assumed to include various conditions. The user-desired condition, however, is limited to a condition at least selectable by the user.

A manner of suppression of on-road power reception when the user-desired condition is not satisfied may be a manner such as prohibition of on-road power reception or setting of an amount of received power in on-road power reception to be smaller than when the user-desired condition is satisfied.

Figure 5:
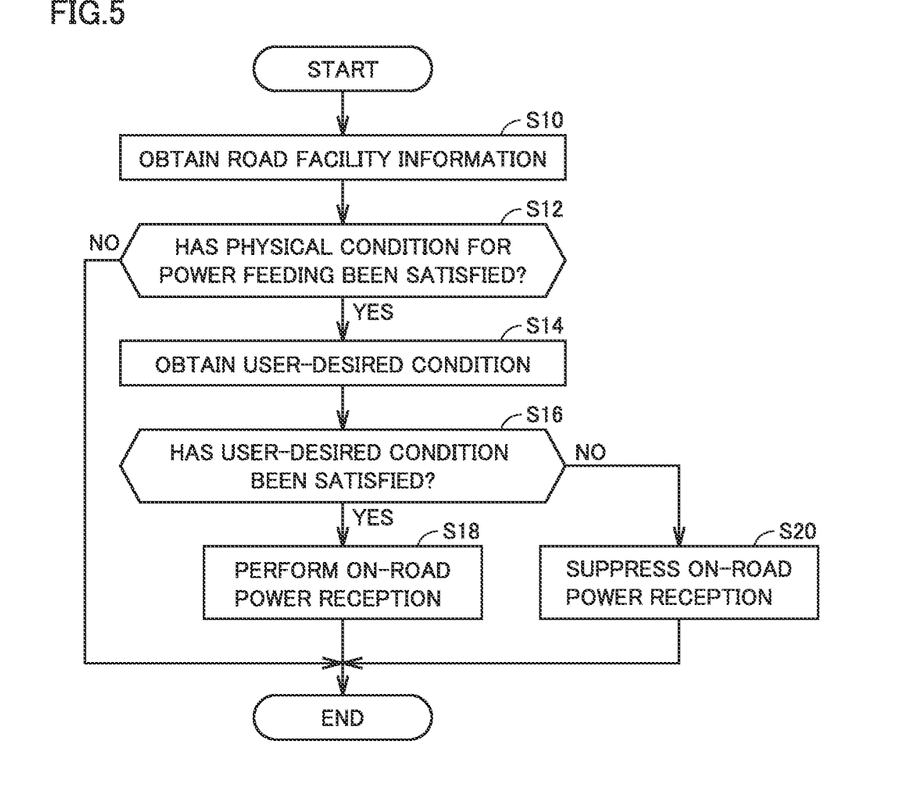
FIG. 5 is a flowchart (No. 1) showing an exemplary processing procedure in on-road power reception.

FIG. 5 is a flowchart showing an exemplary processing procedure in on-road power reception. This flowchart is repeatedly performed, for example, every prescribed cycle. Each step is performed by software processing by processor 111 of ECU 11 of vehicle 1. At least one of steps may be performed by software processing by server 2. Each step may be performed by hardware such as a large scale integration (LSI) arranged in vehicle 1 or server 2.

Initially, processor 111 obtains road facility information from server 2 (step S10). The road facility information includes information on the power feeding specs, the location of placement, the power feeding fee, the power feeding unit price, and the $CO_2$ emission amount of power feeding facility 9 as described above.

Then, processor 111 determines whether or not the physical condition for power feeding from power feeding facility 9 to power reception unit 166 of vehicle 1 is satisfied, by referring to the road facility information or the like (step S12). As described above, processor 111 determines that the physical condition for power feeding is satisfied, for example, when vehicle 1 travels over power feeding facility 9 and power feeding facility 9 and vehicle 1 are physically in a state in which they can normally carry out on-road power reception.

When the physical condition for power feeding is not satisfied (NO in step S12), processor 111 quits the process without performing subsequent processing. On-road power reception is thus not carried out.

When the physical condition for power feeding is satisfied (YES in step S12), processor 111 obtains the user-desired condition stored in memory 112 (step S14). The user-desired condition includes the condition of the fee, the condition of the SOC, the condition of the temperature, the condition of the $CO_2$ emission amount, and the like as described above.

Processor 111 determines whether or not the user-desired condition is satisfied by referring to the road facility information and the SOC, the temperature, and the like of battery 163 (step S16).

When the user-desired condition is satisfied (YES in step S16), processor 111 carries out on-road power reception (step S18).

When the user-desired condition is not satisfied (NO in step S16), processor 111 suppresses on-road power reception (step S20). The manner of suppression of on-road power reception may be such a manner as prohibition of on-road power reception or setting of the amount of received power in on-road power reception to be smaller than when the user-desired condition is satisfied as described above.

Processing in FIG. 5 is not necessarily limited to being repeatedly performed every prescribed cycle, and may be performed, for example, when the travel route of vehicle 1 is set. In this case, the processing shown in FIG. 5 should only be performed for each of power feeding facilities 9 arranged on the set travel route. At the time of setting of the travel route, however, vehicle 1 is not actually traveling over power feeding facility 9. Therefore, in step S12, determination as to the physical condition for power feeding except for the condition of the distance between power feeding facility 9 and power reception unit 166 of vehicle 1 may be made, and in step S18, on-road power reception may be permitted. Then, on-road power reception should only be carried out when vehicle 1 starts traveling and actually travels over power feeding facility 9, on-road power reception from which is permitted.

As set forth above, ECU 11 of vehicle 1 according to the present embodiment includes memory 112 in which the user-desired condition is stored and processor 111 connected to memory 112. When the physical condition for power feeding from power feeding facility 9 to power reception unit 166 is satisfied and when the user-desired condition stored in memory 112 is not satisfied, processor 111 controls power reception unit 166 to suppress on-road power reception. Ordinary on-road power reception forcibly carried out in spite of the user-desired condition not being fulfilled is thus suppressed. Consequently, in vehicle 1 capable of on-road power reception, on-road power reception can be carried out without compromised convenience of the user.

<First Modification>

In the embodiment described above, on-road power reception is carried out when the physical condition is satisfied and when the user-desired condition set in advance is satisfied.

In contrast, when the physical condition is satisfied and the user-desired condition set in advance is satisfied, the user may be inquired of whether or not to carry out on-road power reception.

Figure 6:
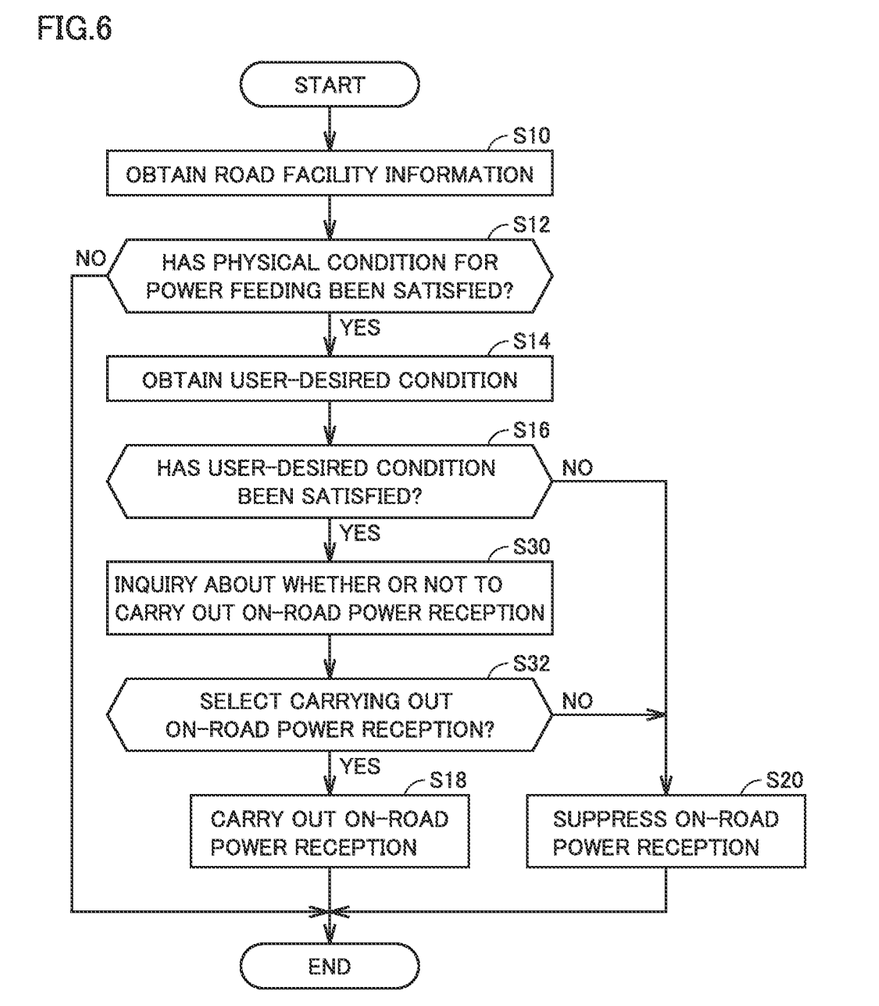
FIG. 6 is a flowchart (No. 2) showing an exemplary processing procedure in on-road power reception.

FIG. 6 is a flowchart showing an exemplary processing procedure in on-road power reception according to the present first modification. The flowchart shown in FIG. 6 additionally includes steps S30 and S32 as compared with FIG. 5 described above. Since other steps in FIG. 6 (steps the same in reference number as those shown in FIG. 5) have already been described, detailed description will not be repeated.

When the user-desired condition is satisfied (YES in step S16), processor 111 inquires of the user of vehicle 1 whether or not to carry out on-road power reception (step S30). For example, processor 111 has a message shown on display 132 to inquire of the user whether or not to carry out on-road power reception.

Then, processor 111 determines whether or not the user has selected carrying out on-road power reception in response to the inquiry in step S30 (step S32). For example, when display 132 accepts an operation by the user to select carrying out on-road power reception, processor 111 determines that the user has selected carrying out on-road power reception.

Then, when the user has selected carrying out on-road power reception (YES in step S32), processor 111 carries out on-road power reception (step S18).

When the user does not select carrying out on-road power reception (NO in step S32), processor 111 suppresses on-road power reception (step S20).

By thus further individually inquiring of the user whether or not to carry out on-road power reception when the physical condition for power feeding is satisfied and when the user-desired condition set in advance is satisfied, on-road power reception more appropriately reflecting desire of the user can be carried out.

Rather than issuing an inquiry to the user each time the physical condition for power feeding is satisfied, the inquiry to the user is issued when both of the physical condition for power feeding and the user-desired condition are satisfied. When the user-desired condition is not satisfied in spite of the physical condition for power feeding being satisfied, on-road power reception is suppressed without the inquiry to the user. Therefore, the number of times of inquiry to the user can be smaller than when the inquiry is issued to the user each time the physical condition for power feeding is satisfied.

<Second Modification>

In an example in which a user can set an on-road power reception mode in which vehicle 1 permits on-road power reception as a travel mode, the processing in FIG. 5 or 6 described above may be performed when the on-road power reception mode is set.

Figure 7:
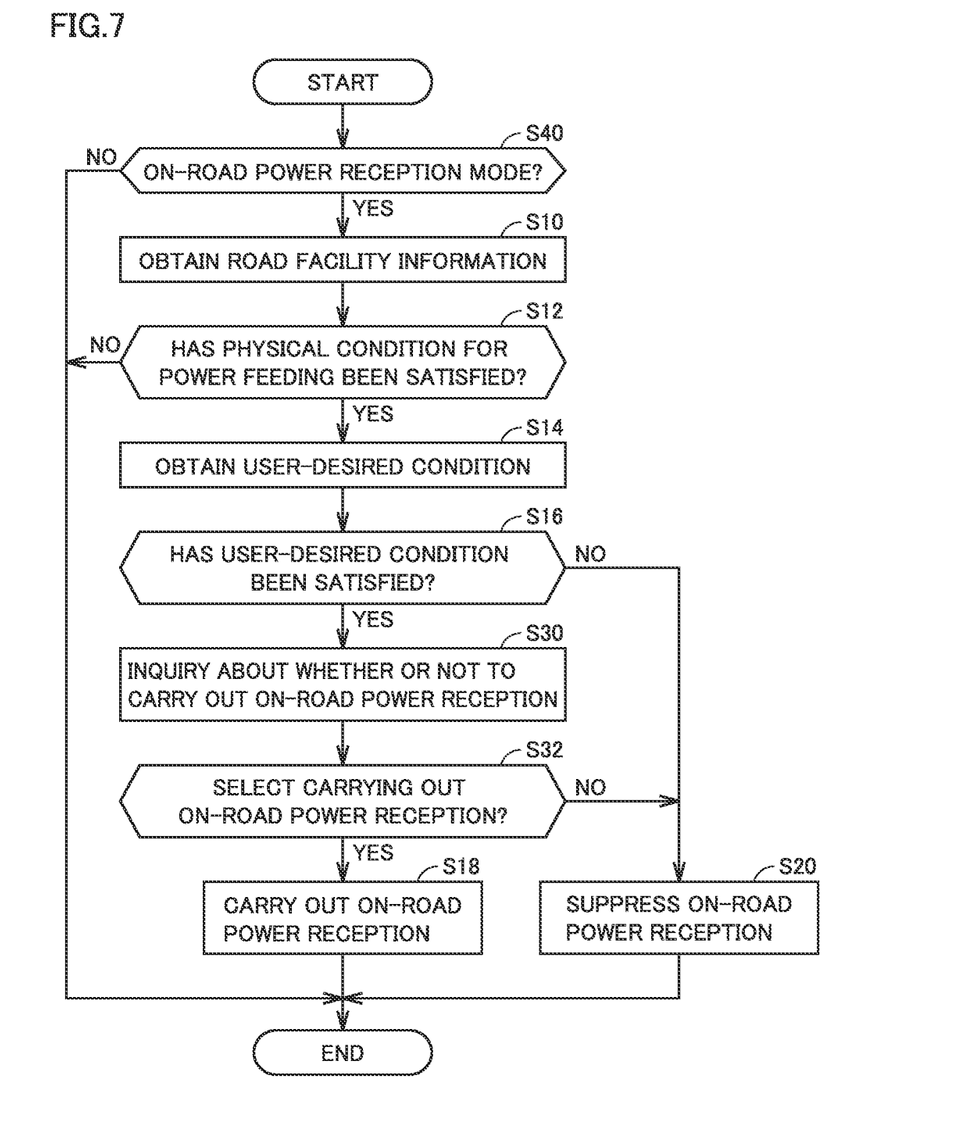
FIG. 7 is a flowchart (No. 3) showing an exemplary processing procedure in on-road power reception.

FIG. 7 is a flowchart showing an exemplary processing procedure in on-road power reception according to the present second embodiment. The flowchart shown in FIG. 7 additionally includes step S40 as compared with FIG. 6 described above. Since other steps in FIG. 7 (steps the same in reference number as those shown in FIG. 6) have already been described, detailed description will not be repeated.

Processor 111 determines whether or not the vehicle is in the on-road power reception mode (step S40). When the vehicle is in the on-road power reception mode (YES in step S40), processor 111 performs processing in step S10 or later.

When the vehicle is not in the on-road power reception mode (NO in step S40), processor 111 quits the process without performing the processing in step S10 or later. On-road power reception is thus not carried out.

Thus, when on-road power reception is not desired for suppression of deterioration of battery 163, for example, in a summer season in which an air temperature is high, the user sets the on-road power reception mode to off so that on-road power reception is not carried out even when both of the physical condition for power feeding and the user-desired condition are satisfied.

<Third Modification>

When the manner of setting the amount of received power in on-road power reception to be smaller is adopted as the manner of suppression of on-road power reception when the user-desired condition is not satisfied, the amount of received power in on-road power reception may be set to be smaller as the fee or the unit price of electric power fed from power feeding facility 9 is higher. The amount of received power in on-road power reception can thus be suppressed in accordance with the fee or the unit price of electric power fed from power feeding facility 9.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A control device that controls an electrically powered vehicle including a power reception unit that wirelessly receives electric power from a facility placed on a road surface of a travel road, the control device comprising:

a memory in which a user-desired condition is stored, the user-desired condition being a condition under which a user of the electrically powered vehicle desires on-road power reception, the on-road power reception being power reception from the facility by the power reception unit while the electrically powered vehicle is traveling on the travel road; and a processor connected to the memory, wherein when a physical condition for power feeding from the facility to the power reception unit is satisfied and when the user-desired condition stored in the memory is not satisfied, the processor controls the power reception unit to suppress the on-road power reception.

2. The control device that controls an electrically powered vehicle according to claim 1, wherein when the physical condition for power feeding is satisfied and when the user-desired condition is not satisfied, the processor prohibits the on-road power reception or sets an amount of received power in the on-road power reception to be smaller than when the user-desired condition is satisfied.

3. The control device that controls an electrically powered vehicle according to claim 1, further comprising a port to which information on the facility is provided, wherein the information on the facility includes information on a fee or a unit price of electric power fed from the facility, and the user-desired condition includes a condition that the fee or the unit price of electric power fed from the facility is lower than a prescribed value.

4. The control device that controls an electrically powered vehicle according to claim 3, wherein when the physical condition for power feeding is satisfied and when the user-desired condition is not satisfied, the processor sets an amount of received power in the on-road power reception to be smaller as the fee or the unit price of electric power fed from the facility is higher.

5. The control device that controls an electrically powered vehicle according to claim 1, wherein the electrically powered vehicle includes a battery for traveling that is charged with electric power received by the power reception unit, and the user-desired condition includes a condition that an amount of stored power in the battery is smaller than a prescribed value.

6. The control device that controls an electrically powered vehicle according to claim 1, further comprising a port to which information on the facility is provided, wherein the information on the facility includes information on a $CO_2$ emission amount in generation of electric power fed from the facility, and the user-desired condition includes a condition that the $CO_2$ emission amount is smaller than a prescribed value.

7. The control device that controls an electrically powered vehicle according to claim 1, wherein when the physical condition for power feeding is satisfied and when the user-desired condition is satisfied, the processor inquires of the user whether to carry out the on-road power reception, and carries out the on-road power reception when the processor receives an answer indicating carrying out the on-road power reception to an inquiry, and when the physical condition for power feeding is satisfied and when the user-desired condition is not satisfied, the processor suppresses the on-road power reception without inquiring of the user whether to carry out the on-road power reception.

8. A method of controlling an electrically powered vehicle including a power reception unit that wirelessly receives electric power from a facility placed on a road surface of a travel road, the method comprising:

obtaining a user-desired condition, the user-desired condition being a condition under which a user of the electrically powered vehicle desires on-road power reception, the on-road power reception being power reception from the facility by the power reception unit while the electrically powered vehicle is traveling on the travel road; and controlling the power reception unit to suppress the on-road power reception when the user-desired condition is not satisfied even when a physical condition for power feeding from the facility to the power reception unit is satisfied.

* * * * *